(12) United States Patent
Osseiran

(10) Patent No.: US 11,700,927 B2
(45) Date of Patent: Jul. 18, 2023

(54) SMART MULTIFUNCTION ELECTRICALLY POWERED SUITCASE

(71) Applicant: Ali Sami Bek Osseiran, Beirut (LB)

(72) Inventor: Ali Sami Bek Osseiran, Beirut (LB)

( * ) Notice: Subject to any disclaimer, the term of this patent is extended or adjusted under 35 U.S.C. 154(b) by 130 days.

(21) Appl. No.: 16/970,093

(22) PCT Filed: Feb. 14, 2018

(86) PCT No.: PCT/US2018/018185
§ 371 (c)(1),
(2) Date: Aug. 14, 2020

(87) PCT Pub. No.: WO2019/160543
PCT Pub. Date: Aug. 22, 2019

(65) Prior Publication Data
US 2021/0000235 A1 Jan. 7, 2021

(51) Int. Cl.
*A45C 13/26* (2006.01)
*A45C 5/03* (2006.01)
(Continued)

(52) U.S. Cl.
CPC .............. *A45C 13/262* (2013.01); *A45C 5/03* (2013.01); *A45C 5/146* (2013.01); *A45C 15/00* (2013.01);
(Continued)

(58) Field of Classification Search
CPC ................................ A45C 13/262; A45C 5/03
See application file for complete search history.

(56) References Cited

U.S. PATENT DOCUMENTS 5,316,096 A * 5/1994 Good ....................... A45C 5/14
280/37
5,339,934 A * 8/1994 Liang ....................... A45C 5/14
280/37
(Continued)

FOREIGN PATENT DOCUMENTS

| CN | 206150680 U | * | 10/2016 | ............. A45C 13/26 |
| CN | 206150681 U | * | 5/2017 | ............. A45C 13/26 |
| WO | WO-2017177552 A1 | * | 10/2017 | ............... A45C 5/03 |

OTHER PUBLICATIONS

CN206150681U English translation (Year: 2017).*

*Primary Examiner* — Jennifer Robertson
*Assistant Examiner* — Justin Caudill
(74) *Attorney, Agent, or Firm* — Bacon & Thomas, PLLC

(57) ABSTRACT

A container, such as a suitcase, bag, cart, valise, or trunk includes various only one of its kind wheel sets combinations, including a wheel set combining both spinner wheels and inline skate wheels in the same article, wheels that extends and retracts for ultimate maneuverability in different scenarios, and utilizing powered wheels incase located at the corner or back side to provided added stability and control when tilting the container or transporting it up stairs. The container also may include advanced convenience features to include other than power assisted motion, may include telescopic handle with electronic components and various additional "high tech" options, such as built-in communication, navigation, navigation and/or direction indication capabilities, mobile phone, WiFi capabilities, USB outlet, rechargeable batteries, electronic power bank charging ports, smart locking, identification and/or tracking, and various safety features.

18 Claims, 6 Drawing Sheets

(51) Int. Cl.
*H04W 4/80* (2018.01)
*A45C 5/14* (2006.01)
*A45C 15/00* (2006.01)
*A45C 13/30* (2006.01)

(52) U.S. Cl.
CPC .. *A45C 2013/267* (2013.01); *A45C 2013/306* (2013.01); *H04W 4/80* (2018.02)

(56) References Cited

U.S. PATENT DOCUMENTS

| | | | | |
|---|---|---|---|---|
| 5,924,533 A * | 7/1999 | Cnockaert | ........... | E05B 65/5276 190/115 |
| 5,984,326 A * | 11/1999 | Abraham | ................. | A45C 5/14 280/38 |
| 6,182,981 B1 * | 2/2001 | Kuo | ........................ | A45C 5/14 190/34 |
| 6,454,065 B1 * | 9/2002 | Chen | ...................... | A45C 5/146 280/37 |
| 6,802,409 B1 * | 10/2004 | Tiramani | ............ | B60B 33/0068 280/37 |
| 6,938,740 B2 * | 9/2005 | Gandy | ...................... | B62B 5/02 280/655 |
| 7,431,311 B2 * | 10/2008 | Turner | ...................... | A45F 4/02 280/30 |
| 7,837,206 B1 * | 11/2010 | Lee | ....................... | B62B 5/0026 280/30 |
| 8,434,577 B1 * | 5/2013 | Al-Qaffas | ................ | A45C 5/14 280/79.2 |
| 9,215,561 B1 * | 12/2015 | Arman | ................... | H04W 4/90 |
| 9,462,863 B1 * | 10/2016 | Augenstein | .............. | A45C 5/14 |
| 9,629,430 B1 * | 4/2017 | Getahun | .................. | A45C 5/03 |
| 9,661,905 B2 * | 5/2017 | O'Donnell | ............... | A45C 5/03 |
| 9,770,084 B1 * | 9/2017 | Shiekh | ................. | A45C 13/005 |
| 9,870,683 B1 * | 1/2018 | Pious | ..................... | A45C 15/00 |
| 10,271,623 B1 * | 4/2019 | Qi | ........................... | A45C 5/03 |
| 2004/0129469 A1 * | 7/2004 | Kader | ...................... | A45C 5/14 180/167 |
| 2006/0087432 A1 * | 4/2006 | Corbett, Jr. | ........ | G08B 13/1427 340/572.1 |
| 2007/0045370 A1 * | 3/2007 | Hsieh | ........................ | A45F 3/04 190/110 |
| 2007/0131462 A1 * | 6/2007 | Hemsley | .................. | A45C 5/14 180/19.3 |
| 2008/0230339 A1 * | 9/2008 | Pereira | ..................... | A45C 5/14 280/47.2 |
| 2010/0018821 A1 * | 1/2010 | Minaker | .................. | B62B 5/06 190/115 |
| 2010/0175960 A1 * | 7/2010 | Moskowitz | .......... | A45C 13/262 190/11 |
| 2014/0107868 A1 * | 4/2014 | DiGiacomcantonio | .. | A45C 5/14 701/2 |
| 2014/0277841 A1 * | 9/2014 | Klicpera | ............. | A45C 13/385 701/2 |
| 2015/0034402 A1 * | 2/2015 | Dourado | ................... | A45F 4/02 180/181 |
| 2015/0327638 A1 * | 11/2015 | Ghosh | ...................... | A45C 5/14 180/167 |
| 2016/0229437 A1 * | 8/2016 | Jackman | .................. | H02P 7/28 |
| 2017/0086549 A1 * | 3/2017 | Caputo | ................ | A45C 7/0022 |
| 2017/0188679 A1 * | 7/2017 | Jacob | .................... | A45C 15/00 |
| 2017/0220040 A1 * | 8/2017 | London | ................... | B60Q 5/00 |
| 2018/0360177 A1 * | 12/2018 | Kovtun | ............... | G05D 1/0255 |

* cited by examiner

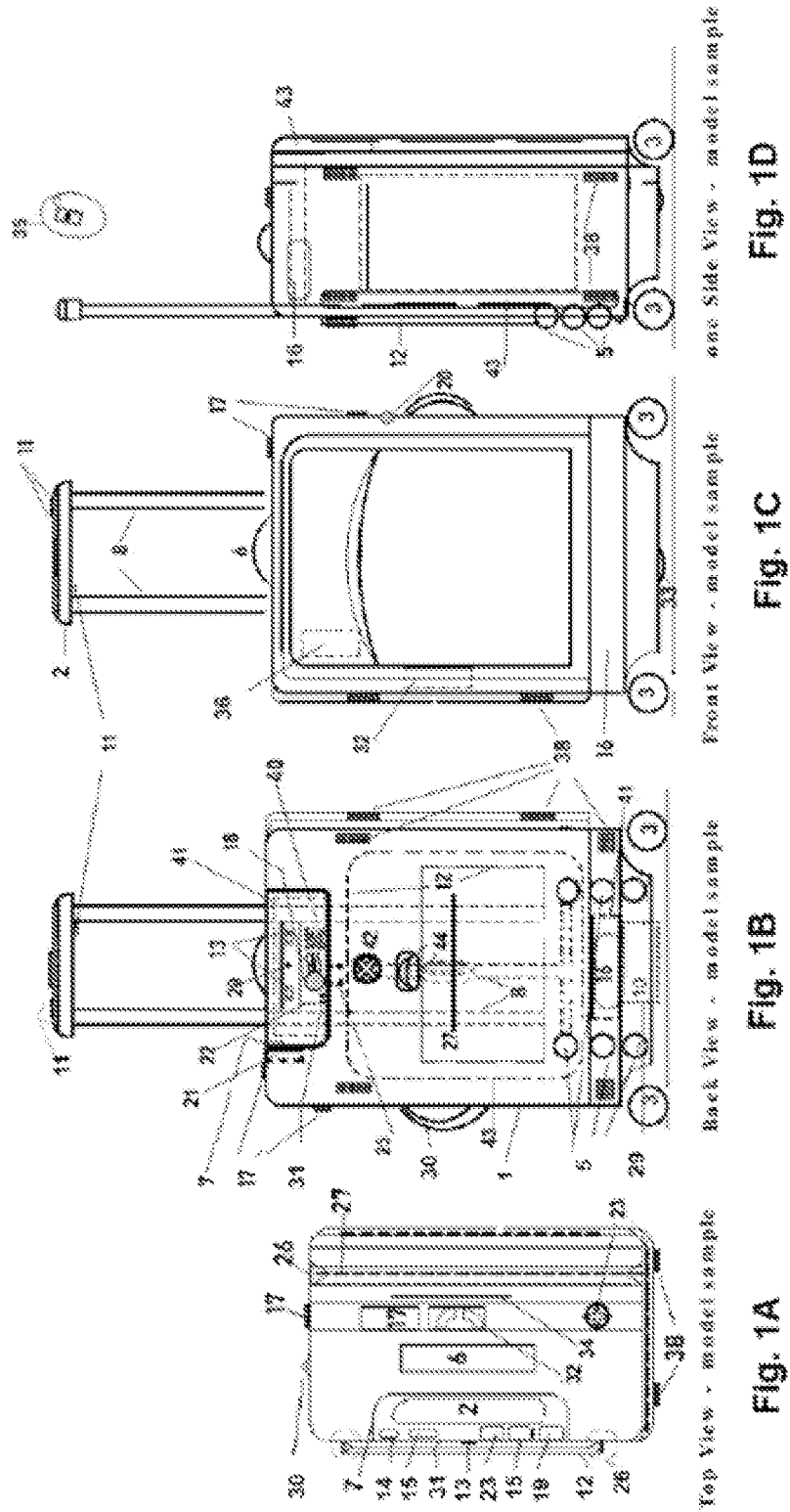

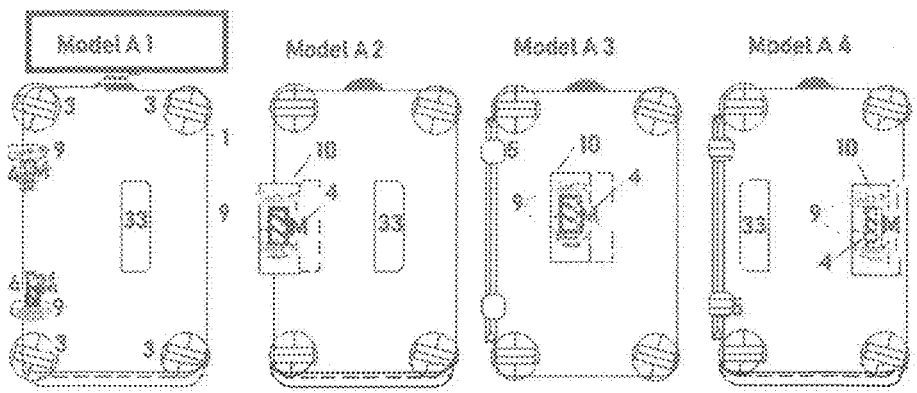
FIG. 2A1  FIG. 2A2  FIG. 2A3  FIG. 2A4
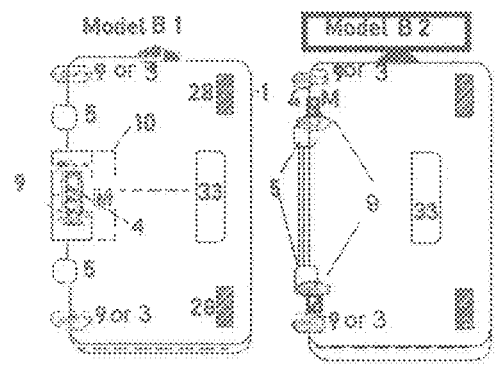
FIG. 2B1  FIG. 2B2
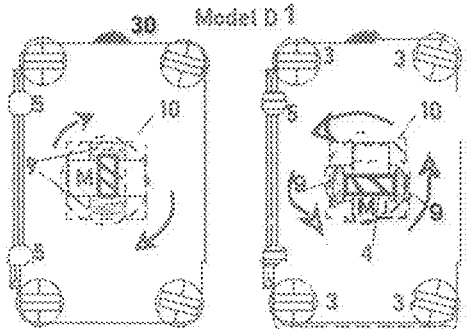
FIG. 2C1  FIG. 2C2
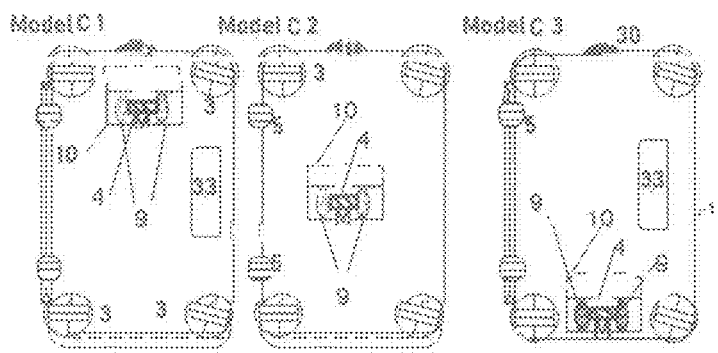
FIG. 2D1  FIG. 2D2  FIG. 2D3

Glossary corresponding to designated numbers used

| # | Description | # | Description |
|---|---|---|---|
| 1 | Article / Luggage body | 12 | Easy Access section for storage. |
| 2 | Smart Telescopic Handle with soft and or hard ergonomic grip. It may house electronic parts and modules, controls buttons and or pressure transducers, depending on design model | 13 | USB Power Charging Port |
| 3 | Spinner Wheels or Swivel Caster Wheels | 14 | WiFi Panel, phone interface and indicators |
| 4 | M or Motor (one or more) for inline skate type wheels with or without switchable direction, depending on design model | 15 | Panel indicators status lights |
| 5 | Side Rollers Wheels, varies depending on design model and if used | 16 | Compartment for Power Bank (Portable). |
| 6 | Top Handle | 17 | Locks |
| 7 | Handle Cup depending on design model | 18 | Radio and Speakers. Location varies depending on design model |
| 8 | Tubes Depending on Design of model, it can be located within exterior walls, inside or outside. | 19 | Digital Scale Indicator Panel. |
| 9 | Inline Wheels | 20 | Guide Light |
| 10 | Wheels Housing and Compartment for Motor Design and Location varies depending on parts used and design model and if used | 21 | Proximity Sensors module and Anti-theft Alert. Location varies depending on design model and if used |
| 11 | Control Buttons | 22 | Power On/Off module. Location varies depending on design model |

Fig.3A

Glossary corresponding to designated numbers used

| # | Description | # | Description |
|---|---|---|---|
| 23 | Navigation and or customized compass based Landmark module indicator. Location varies depending on design model and if used | 34 | Adjustable Add-Strap. Location varies depending on design model and if used |
| 24 | Not Used | 35 | Wireless remote control transmitter / Receiver. Location varies depending on design |
| 25 | GPS location Tracker module. Location varies depending on design model and if used | 36 | Wireless tele-communication, fixed or removable, with or without SIM and may include reserved control buttons for presetting secured emergency numbers and or may include the option when dialing an assigned number has the option of answering service and sending back a message and or GPS location varies depend on design and if used |
| 26 | Expandable Section. Locations varies depending on design model and if used | | |
| 27 | Security Zipper Locations varies and if used | 38 | Bumper/bar Guards; Locations varies depending on design model and if used |
| 28 | Bottom Support Stand Bar – Pedestal; Varies depending on design model and if used | 39 | RFID shield interior compartment, Location varies depending on design mode and if used |
| 29 | Headphone outlet Location varies depending on design mode and if used | 40 | ID Tag and or QR tag. Location varies depending on design mode and if used |
| 30 | Side Handle | 41 | Fire Retardant box / case for battery (fixed and or portable) Location varies depending on design |
| 31 | Power Battery Recharge outlet. Location varies depending on design mode | 42 | Release Mechanism Location varies depending on design mode and if used |
| 32 | External hook: Location varies depending on design if used. | 43 | Vacuum Bag |
| 33 | Bottom grip – Location varies depending on design and if used | 45 | Secondary Weight Support Wheels Varies depending on design and if used |
| 46 | Strut for weight / Balance wheels. May include adjustable length. Location and design varies depending on design model and if used | | |

Fig. 3B

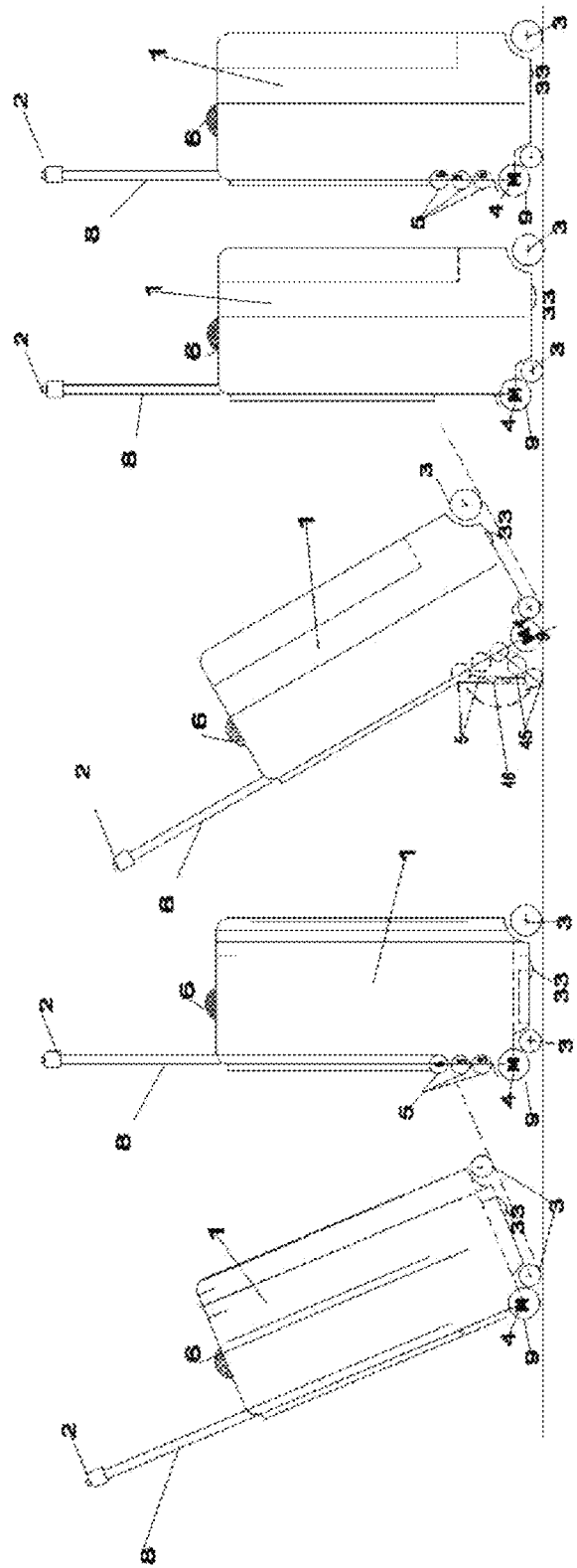

SMART MULTIFUNCTION ELECTRICALLY POWERED SUITCASE

BACKGROUND OF THE INVENTION

1. Field of the Invention

The invention relates to a container, and in particular to luggage or another article intended to assist the individual in carrying one or more items while traveling, running errands, a powered wheeled container combining different wheel sets including powered, non-powered and other innovative wheel sets some of which have the ability to be deployed into a weight support position and others of which have the ability to swivel or pivot, allowing changing its direction when transporting goods and personal effects or the like. The container may, by way of example and not limitation, be a suitcase, bag, cart, valise, or trunk.

The container of the invention may include, by way of example and not limitation, power assisted motion and give users the option to use transport luggage either with powered or unpowered wheels or both. Additional conveniences and "high tech" options include unique new wheel assembles, electric motors, a distinctive telescopic handle, fire retardant materials, safety elements, built-in communication, navigation, entertainment and/or direction indication capabilities, smart identification, locking and/or tracking, and other features which will be apparent from the following description.

2. Description of Related Art

Luggage development has come a long way since the days of old world trunks and valises. In the early days people used those big trunks for their luggage, the ones that it took two people to carry. Then came the one-handle suitcase. Then the suitcase with wheels. The present invention represents the next step in this evolutionary process, by providing various embodiments that each address one or more of the following deficiencies of currently-available or proposed wheeled suitcases:

Conventional wheeled suitcases tend to be relatively heavy, with some suitcases intended as checked luggage exceeding eight kilograms in weight when empty. Even when reduced to carry-on size the weight of the suitcases may make them difficult to carry, despite the relatively small interior dimensions. As a result, the suitcases cannot easily be transported, moved up stairs, or lifted for storage or security checks, or for those seeking to lessen the burden of handling luggage, transport upstairs, or across narrow spaces, etc.

The difficulty in handling the conventional suitcase is compounded by limitations inherent in various wheel designs. Wheeled suitcases are conventionally designed with either in-line non-swiveling wheel types or swiveling spinner or caster (single or double) wheel types, but not both types of wheels simultaneously in the same suitcase, limiting the ability of the user to use either one of the wheel types as the transport situation requires. Some cities such as Venice, Italy, prohibit motorized means of transportation on the streets and restrict it to water boats, so that this invention can be especially helpful for tourists and residents and provide a solution for this challenge of carrying luggage.

In order to add convenience features such as self-powered wheels, the suitcase must be adapted to include controls. However, telescopic handle designs of conventional wheeled suitcases may be incompatible with electronic controls, or make their inclusion difficult or impractical. In addition, motors and batteries, if provided in the conventional suitcase, not only add weight, but also take up a relatively large amount of space, further reducing the space available for packing articles. The motors that are included are limited to a specific motor type and lack flexibility in design, or fail to utilize other advanced technologies.

Prior art self-propelled suitcases use different technologies and methods to auto-follow an owner. In lieu of handle controls, self-propelled suitcases have been proposed that maintain a predetermined distance from a user without contact, based on sensor input to allow the suitcase to follow the user on its own. However, these auto-follow robotic suitcases, which are designed for hands-free operation without the need for physical contact during transporting, steering and controlling, are impractical and hazardous in many situations, especially when used in publicly jammed areas such as airports, sidewalks, steps and ramps, etc., because they impose safety or tripping hazards for the public and have a tendency to hit obstacles, people, or animals that happen to be in their way. Such auto-follow suitcases require more focus by users to watch and ensure that their luggage is following the right path at all times, thus occupying the user's full attention and distracting the user from focusing on more important matters, such as gate signs, directions, time, and so forth, or simply enjoying the surroundings or traveling companions. The lack of a person physically controlling the suitcase presents safety and security concerns such as hitting or tripping people crossing the suitcase's path, especially when everyone is too in a hurry to pay attention to independent moving articles at below eye level, and makes the suitcase more susceptible to theft or tampering. This is especially problematic in airports where it is not allowed to leave luggage unattended for any length of time.

The above mentioned auto-follow suitcases depend on other gadgets with receptors or transmitter sensors to operate properly. The gadgets, which may for example take the form of or be integrated with watches, bracelets, or shoes, which can easily be forgotten or lost, and require synchronization with suitcase electronics. Other conventional power assisted containers or luggage, on the other hand, are totally different in design, concept, weight, function, capacity, features, limitations, and/or choice of models (only available in one size), etc.

While the conventional luggage might seem to share some features of the invention, there are numerous differences. For example, while conventional suitcases may have tracking capabilities, they fail to include related improvements such as using a smart QR ID code to enable tracking in case of loss. Other luggage that does have tracking capabilities may lack Wi-Fi connection capabilities such as automatic scan and connectivity for updating the positioning of luggage and communication link, and still other luggage with advanced tracking or other capabilities may not meet airlines regulations and those of concerned authorities. Additional deficiencies of conventional luggage may include any of the following:

Conventional suitcases fail to incorporate additional convenience features such as a built-in radio or media player, speaker(s) and/or headphone outlets, power status and other indicators, and so forth.

Luggage and other devices with electronics and batteries, and/or the contents of such luggage, may represent fire hazards and lack safety elements or features such as fire suppressant materials, shields, intumescent strips and other protective features to act as fire and smoke retardants, as well as instruments or devices to provide protection against power overloads, short-circuits, thermal stresses for additional safety factors.

Conventional luggage with communications capabilities, or that emit electromagnetic radiation, may lack a; flight mode or flight mode duration timer settable by an electronic connection or remotely by a wireless setting.

Conventional suitcases may lack a built-in or removable mobile phone, which may be especially helpful in needed situations, particularly with the inclusion of a button that dials a preset number to make a personal or emergency call and share location by electronic message.

Conventional suitcases, including those designed for carry-on use, may lack:
a) special access compartments that enable easy removal of and access to frequently removed or needed items, for example to remove electronic devices during airport security screening without opening the suitcase main compartments;
b) a multifunction telescopic handle for electronically steering the suitcase and that houses electronic components, operation controls, and/or sensors that control at least one wheel-driving motor;
c) at least one vacuum bag stored within the container body portion, to reduce a volume of contents and that can be used as a quick access compartment to enable removal of items from carry-on luggage for airport security checks without opening the main compartment;
d) a leash component with at least one function per leash module, to control and facilitate user handling of the container on stairs or inclined ground surfaces and another leash module to release a motorized wheel assembly into an extended position.

SUMMARY OF THE INVENTION

In accordance with one aspect of the present invention, a container such as a suitcase is provided with multiple and different wheel sets for different models, including i) a first set at the bottom of the suitcase including at least four spinner multidirectional wheels or swivel casters (foldable or fixed type) ii) a second set made of in-line or fixed caster wheels with the option of being adjustable into various positions or foldable so that the wheels can be folded into a concealed box that may be protected by foldable racks when in a parked position, with wheel positioning adjustment by either mechanical or electromechanical means, and iii) a third set comprising a weight supporting wheel module, positioned at back side of luggage body, consisting of side rollers/wheels positioned at the back side or corner of the suitcase to transfer luggage weight acting as additional support when luggage or container is being transported in a tilted position or vertically such as over steps or stairs, and which may also be in a stationary position or arranged to be moved in and out of a position, and which is stored within or flush with the casing of the container and when deployed pivots into a weight-supporting position by a releasing mechanism, and a fourth set including at least two caster wheels operated by at least one electric motor and having a mechanism to enable the user to switch the orientation of all powered wheel module from one direction to another, such as in horizontal plane from a x-axis direction to a y-axis direction. The various wheel sets enable the suitcase to be pushed, pulled, or dragged in all directions, i.e., along any of three orthogonal axes, and may include a power assist feature in which at least one of the wheels is driven by a miniature electric motor to enable either powered or non-powered movement of the suitcase. Furthermore, the container may include an exclusive extendable handle grip comprising electronic components such as control buttons for a powered wheel, switches and or sensors, and that may utilize any of its extendable tubes for wiring purposes if needed, as well as many other exclusive design attributes, functions and characteristics herein described in this document.

In another aspect of the invention, a suitcase is designed to have a relatively light weight for its size, preferably less than six kilograms for a carry-on/cabin size piece of luggage and less than eight kilograms for checked-in sizes, while still providing power assist and other "smart" and/or convenience features such as optional USB outlets and/or a power adapter, a digital self-scale, and may include communication capabilities such as Bluetooth, WiFi, RFID, and/or other communication means, and added safety features to account for fire hazards resulting from the inclusion of a portable battery and meet or exceed airline and FAA regulations, such as emergency fire suppressants, intumescent strips, shields, and/or protective material to surround the battery and other conductive components, as well as circuit breaker or power disconnection circuits to protect against power overloads, short-circuits, thermal stresses, and direct and indirect contact with electrical currents.

According to another aspect of the invention, the suitcase may include a distinctive telescopic handle that can be used not only for steering the suitcase, but may also house electronic components, operation controls, and/or sensors that control the motor or motors.

Additional features that may be provided in embodiments of the invention include the use of high grade soft, hard, or hybrid materials, solar charging capabilities, quick access compartments for carry-on size suitcases that make it possible to quickly remove items from the luggage for airport security checks without opening the main compartment, the incorporation of one or more manually operated vacuum type bags that can substantially reduce the volume of the luggage; a detachable sack or pocket that can be removed from the luggage in order to keep essential articles such as medications or electronics closer at hand when checking the suitcase or storing it in an overhead bin, a leash that facilitates user handling on stairs or to release a motorized wheel assembly into an extended position; smart identification tags or QR capabilities, and/or GPS tracking capabilities, to facilitate recovery of the luggage in case it becomes lost; proximity sensors including reporting means, distance indicator, and/or remote ringer that can be used to monitor both the luggage itself as well as proximity of small objects such as smart phones or tablets with respect to the luggage; WiFi capabilities including automatic connection to previously recognized publicly available services; and incorporation of a fixed or removable mobile phone, with or without smart and navigation features, but which preferably may at least be equipped to provide one button communications with personnel or authorities and to provide them with current location. In addition, the suitcases or other containers of the preferred embodiments may be provided with a compass or direction indicating capabilities, which are especially helpful for indicating the direction of Quibla/Makkah or to point in the direction of certain landmarks in order to assist in locating them.

The suitcases or other containers of the preferred embodiments may utilize smart lock technology, such as locks that employ near field communication (NFC) to toggle a locking mechanism with a signature device, or a smartphone app, in addition to the traditional auxiliary combination or key to toggle the locking mechanism in case, for example, of a misplaced NFC tag, or in case the smartphone or tablet has a dead battery. Smart locks may also include other security features such as electronic register recording of the times the lock has been opened.

Further features that may be provided in the suitcases of the preferred embodiments include the use of one or more compact rechargeable multipurpose battery power banks, such as Lithium-ion battery packs, having diagnostic indicator panels; a telescoping handle that includes an inside groove or more for accommodating electric wiring and/or electronics and which may be long enough to easily accommodate a second bag on top; a flight mode option for electronics that can be set by direct controls or remotely by wireless setting means; wheels that are adjustable in vertical and/or horizontal directions, and/or detachable, by mechanical and/or electromechanical mechanisms and controls; motor speed control and setting; an easy link device or appliance that connects multiple suitcases together for simultaneous transport; a radio, mp3 player, pilot light, alarm clock and/or head phone outlet; an expandable body, handy front pocket for convenient access to all essentials, and laptop slot; one or more speaker amplifiers; the use of a variety of zipper types (including security and double zippers) and/or clips to hold the suitcases of the preferred embodiments securely in a closed position; and any other comfort or convenience features to further assist travelers in transporting luggage and thus make travelling more pleasant and self-sufficient.

BRIEF DESCRIPTION OF THE DRAWINGS

FIGS. 1A-1D are respective top, back, front, and side views of a suitcase constructed in accordance with the principles of a preferred embodiment of the invention.

FIGS. 2A1-2A4, 2B1-2B2, and 2D1-2D3 are bottom views of different power assist wheel configurations for use in preferred embodiments of the invention. FIGS. 2C1 and 2C2 respectively show different positions of a power assist wheel in a configuration in which the direction of the power assist wheel is changeable using a swivel mechanism.

FIGS. 3A and 3B are tables of additional features that may be included in suitcases constructed in accordance with principles of the invention.

FIGS. 4A-4D are side views of various positions of a suitcase that includes the wheel configurations illustrated in FIGS. 2A1 and 2A2.

DETAILED DESCRIPTION OF THE PREFERRED EMBODIMENTS

Figure 5:
FIG. 5 shows a collection of icons representing features, including various "smart" features, that may be included in the preferred suitcase.

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

As illustrated in FIGS. 1A-1D, a suitcase constructed in accordance with the principles of a preferred embodiment of the invention includes a casing 1 having an extendable handle that includes a handle grip 2 and a pair of telescoping tube assemblies 8 that extend from the casing 1 to the grip 2, and that allow the grip 2 to be moved from a position flush with the top of the casing to an extended position sufficiently far from the casing to allow a user to pull the suitcase by grasping the grip 2 with one hand while in an upright position and walking alongside while at least four of the wheels 3 and at least one powered in-line wheel roll along the ground, as shown in FIGS. 2A3, 2A4, 2C1, 2C2, and 2D1 to 2D3 which are bottom views showing various such wheel configurations. Telescoping handle assemblies per se., i.e., handle assemblies with or without additional electronic control features (described herein) are well known and the present invention is not limited to any particular telescoping arrangement or configuration. The telescoping tube assemblies may, for example, include one or more tubes that fit within one another and/or extend from a corresponding mechanism or fitting within the casing 1. As shown in FIGS. 1B, 1D, 2A3, 2A4, 2B1, 2B2, 2C1, 2C2, and 2D1 to 2D3, side rollers 5 are located at a lower back side form part of a secondary weight support and balance wheels 45 attached to a strut weight balancing 46. A leash 44 that facilitates user handling on stairs or to release a motorized wheel assembly into an extended position is also shown in FIG. 1B.

The dimensions of the casing may be those of a carry-on bag designed to fit within the overhead compartment of an airliner, although the invention may be also applied to a full range of suitcase sizes and other items of luggage or containers. In addition, the casing 1 may be made of a variety of materials, including rigid and soft materials, and is not limited to a particular material.

The casing 1 further includes a side handle 30 and/or top handle 6 that allows the casing to be carried or lifted by the handle in order to, for example, place the suitcase in a car trunk or the overhead bin of an airliner.

As illustrated in FIGS. 2A3, 2A4, 2B1, 2B2, 2C1, 2C2, and 2D1 to 2D3 wheels 3, 9, or 45, and/or wheel assembly 10, may be arranged in various configurations. For example, FIGS. 2A3, 2A4, 2C1, 2C2, and 2D1 to 2D3 show non-motorized wheels 3 on four sides of the base of casing 1, in combination with one or more of the motorized wheels or wheel assemblies situated at a center or side of the casing bottom.

The wheels 3 may be in the form of swivel caster or 360-degree spinner wheels positioned at four corners of the suitcase bottom to allow manual movement of the suitcase in any direction along a flat surface, when desired. A power assist for movement along the flat surface may be provided by wheels 9 or wheel assemblies 10 situated anywhere along the bottom of the suitcase, the wheels 9 or wheel assemblies 10 are driven by a motor, which also may be situated at any location on the bottom surface, including positions adjacent respective powered wheels or within the wheel hub or wheel assemblies. By way of example and not limitation, a motor may be housed in compartment 29 illustrated in FIG. 1B.

The motorized wheel or wheels 9 shown in FIGS. 2A1 to 2A4 and 2B1 to 2B2 may be in the form of fixed caster or in-line wheels, or may have multiple interchangeable directions as shown in FIGS. 2C1 and 2C2, which show two positions of the drive wheel. External miniature motors may replace in-hub motors. Those skilled in the art will appreciate that the invention should not be limited to a particular motor type or drive train. For example, the motor (whether provided as an in-hub motor or an external motor) may be a geared or gearless electric motor, block transmission type electric motor, brushed or brushless motor, with or without a built-in controller, while the drive train may include any of a variety of gears.

In the embodiments labeled as shown in FIGS. 2A1 to 2A4, the motorized wheels 9 are positioned on the bottom side of the suitcase, and may be positioned at an edge slightly above the horizontal plane of the suitcase bottom or base to provide a power assist when the suitcase is tilted.

In a variation that can be used in other models, an additional wheel assembly 45 may be added to provide additional stability when the suitcase is tilted. The wheel assembly 45 can be positioned flush with the sides of the suitcase and, when released by the releasing mechanism 42 shown in FIG. 1B, may be pivotable, as shown in FIG. 4C, or deployed to engage the floor as a strut to decease labor by the user and add extra stability or a power assist is desired, as also shown in FIG. 4C.

Power to the motor or motors 4 may be provided by batteries included in a portable power bank compartment 16 visible and accessible from inside the suitcase body at an upper end, or a portable power bank compartment 16 accessible from the suitcase interior at a bottom side of the suitcase. Multiple power banks may also be provided, with the lower power bank providing power to the wheels and the upper power bank providing power for electronic accessories as described below. The batteries may include, but are not limited to, Lithium ion batteries, which may be stored for fire protection in a fixed or portable insulated battery casing 41 that includes fire retardant materials and intumescent sealant to contain sparks, fire, or smoke originating from the battery or batteries. A socket 31 may optionally be provided on an exterior of the casing 1 to allow recharging of the batteries without opening the suitcase.

The suitcase of the preferred embodiments may be provided with any of a variety of electrical or electronic accessories, including but not limited to "smart" and/or convenience features such as optional direction indicator or compass 23, which could be used for example to indicate Qibla or another landmark direction. In addition to USB and power charging ports/outlets and/or power adapter(s) 13 provided on an exterior of the casing 1, the suitcase may include a digital self-scale including a display 19 and weight sensors (not shown), and communication capabilities such as Bluetooth, WiFi, and RFID in compartment 39, and/or other communication means and wireless remote control capabilities, and an application module. The control functions may include control of motorized wheel movement and direction via a dedicated remote control 35, the user's smartphone, or another device capable of handling control inputs, as well as flight mode activation for preventing prohibited transmission during flight, takeoff, or landing.

As illustrated, the suitcase of the preferred embodiments may also include smart identification or QR tags 40, and/or a GPS module 25 that provides tracking capabilities, to facilitate recovery of the luggage in case it becomes lost. Further loss prevention may be provided by optional proximity sensors 21, distance indicator, and/or remote alarm ringer that can be used to monitor both the luggage itself as well as proximity of small objects such as smart phones or tablets with respect to the luggage, including reporting means for alerting an owner via the above-mentioned communications capabilities. Further security may be provided by the inclusion of appropriate locks, such as a Tesa, Travel Sentry, or other airport security check compatible lock 17 and/or an NFC or Bluetooth based remotely controllable smart lock, and other additional or redundant locks (not shown), an electronic register recording of the times the lock has been opened and so forth. For example, optional features may include smart lock technology that may utilize locks that employ near field communication (NFC) to toggle a locking mechanism with a signature device, or a smartphone app, in addition to an auxiliary combination or key to toggle the locking mechanism in case of a misplaced NFC tag, or in case the smartphone or tablet has a dead battery.

One way to establish communications for purposes or remote control of the suitcase is via WiFi, and therefore the suitcase may be provided with WiFi capabilities including automatic connection to previously recognized publicly available services via a WiFi locator module, and/or cellular network communication capabilities. The suitcase may also include a built-in speaker and radio module 18 and/or an MP3 player. Also, a built-in or removable cellular or mobile telephone 36 with an emergency power supply, preset speed dialing numbers for one-button communication, and the ability to send a message with GPS location upon request. It will be appreciated that any electronic accessories or features may require appropriate indicators such as status indicator lights 14 and 15, pilot light 20, an on/off module, circuit boards or modules, interface and control mechanisms and electronics, connectors, and so forth, which may be situated within the suitcase, as will be understood by those skilled in the art.

While the principles of the invention may be applied to a variety of container and luggage configurations, in the suitcase example illustrated in FIGS. 1A-1D, the suitcase may include such features as a detachable external side pocket 12 and an easy-access front compartment 43 for easy access to carried items without having to open the main compartment of the suitcase. For example, the detachable side pocket 12 may be detached when checking or storing the luggage in an overhead bin to keep medications, small electronics, reading materials and other items close at hand, while the front compartment may be provided in carry-on luggage and include a secure closure such as a zipper 27, clip, or snap latch to afford quick access, without having to unlock the suitcase, to electronics or other items that need to be taken out for airport security. In addition, an expansion panel 26 may be included in the exterior casing 1 of the suitcase to permit expansion of the main compartment, and the suitcase may include such additional optional convenience features as a bottom grip or handle 33, provision for an adjustable add-on carrying strap 34 and external hook 32, bumper guards 38 at various locations on the casing 1, and pedestals 28.

What is claimed is:

1. A wheeled container having multiple wheel sets, comprising:
   a body portion, including at least one compartment for holding personal items and goods; and
   multiple selectively usable wheel sets, including:
      a first wheel set including a first type of wheels and positioned at a bottom of the body portion, said first wheel set being positioned in a plane that is horizontal when the container is in an upright position; and
      a second wheel set including a second type of wheels positioned at an edge on at least one side of the bottom of the container,
      wherein one of the first or second wheel sets includes at least four multidirectional spinner wheels or at least four swivel caster wheels,
      wherein another of the first and second wheel sets includes at least one powered non-swiveling wheel on a handle side of the container and above said plane at the bottom of the container,
      wherein the at least one power non-swiveling wheel is adapted to be driven by a motor to propel the container when the container is tilted to be supported by the at least one powered non-swiveling wheel,
wherein a user is able to select alternative transport modes, including (a) a manual transport mode in which the container is manually propelled by the user while the container is supported by four of the multidirectional spinner or swivel caster wheels in an upright position when the container is pulled by an extendable handle, and (b) a driven transport mode in which the container is propelled by movement of the at least one non-swiveling wheels wheel driven by the motor, and
wherein the extendable handle includes a handle grip and at least one electronic component for controlling the motor; and
at least one power source including at least one rechargeable portable battery, the power source supplying power to at least the motor.

2. A wheeled container as claimed in claim 1, wherein the container is a suitcase.

3. A wheeled container as claimed in claim 2, wherein the container is a carry-on suitcase having dimensions arranged to enable the suitcase to fit into an overhead compartment or under a seat of a passenger airplane, and further comprising a detachable sack or pocket arranged to be removed from the suitcase in order to keep essential articles closer at hand when checking the suitcase or storing it in an overhead bin.

4. A wheeled container as claimed in claim 2, wherein the at least one compartment comprises multiple compartments arranged to enable removal of items from carry-on luggage for airport security checks without opening the main compartment, and at least one of the following:
at least one vacuum bag stored within the container body portion and available to reduce a volume of contents of the suitcase; or
at least one detachable sack or pocket to keep essential articles closer at hand when checking the suitcase or storing it in an overhead bin.

5. A wheeled container as claimed in claim 2, further comprising a compass or direction indicating capabilities for at least one landmark location.

6. A wheeled container as claimed in claim 5, further comprising one or more of the following: at least one power outlet; at least one power adapter; at least one auxiliary outlet; the at least one rechargeable battery; a radio module, an MP3 module; at least one built in speaker; at least one power bank including charging ports for charging other electronics; a digital self-scale module; wireless communication capabilities; at least one safety feature including fire suppressants and protective material to surround a battery the at least one rechargeable battery; at least one circuit breaker; at least one alarm clock; a head phone outlet; one or more converter to expand a volume of the container; or automatic Wi-Fi connection to a recognized Wi-Fi service.

7. A powered wheeled container as claimed in claim 2, further comprising a telescopic handle and grip including at least one of electronic components, controls, or sensors for controlling at least one of the powered fixed-direction wheels driven by the motor.

8. A wheeled container as claimed in claim 1, further comprising at least one leash to facilitate user handling of the container on stairs or to release a motorized wheel assembly into an extended position.

9. A wheeled container as claimed in claim 1, wherein the container includes at least one of the following features:
a smart identification tag or QR identifier positioned at a top of the container;
GPS tracking capabilities, to facilitate recovery of the container in case it becomes lost;
proximity sensors including reporting means and a distance indicator;
a remote ringer that can be used to monitor both the container itself as well as proximity of linked electronic or communications devices with respect to the container;
at least one wheel that can be detached; or
at least one of the wheel sets being vertically or horizontally adjustable.

10. A wheeled container as claimed in claim 9, further including a removable or built-in mobile phone having preset buttons for emergency calls and a quick share location function.

11. A wheeled container as claimed in claim 10, further comprising at least one of: (a) smart lock technology utilizing locks that employ wireless communications to toggle a locking mechanism with an electronic device to toggle the locking mechanism in case of a misplaced NFC tag, or in case the smartphone or tablet has a dead battery; (b) said smart lock technology combined with a mechanical combination lock and/or key lock; or (c) an electronic register recording and/or showing at least the last times the lock has been opened.

12. A powered wheeled container as claimed in claim 1, further comprising a mechanism that enables the non-swiveling wheels to be rotated by ninety degrees from a first orientation to a second orientation.

13. A wheeled container as claimed in claim 12, further comprising a third set of wheels including wheels of a third type positioned at a back side or corner of the container to support a weight of the container when the container is being transported in the tilted position or vertically on an inclined surface or over steps and arranged to be moved to a position that is within or flush with a casing of the container, wherein the third set of wheels is released by a releasing mechanism from the position that is within or flush with a casing of the container so as to pivot to a position in which the third set of wheels rests on the inclined surface or steps to contribute to support of the weight of the container.

14. A wheeled container as claimed in claim 12, wherein the container is a suitcase.

15. A wheeled container as claimed in claim 14, wherein the container is a carry-on suitcase having dimensions arranged to enable the suitcase to fit into an overhead compartment or under a seat of a passenger airplane, and further comprising a detachable sack or pocket arranged to be removed from the suitcase in order to keep essential articles closer at hand when checking the suitcase or storing it in an overhead bin.

16. A wheeled container as claimed in claim 14, wherein the at least one compartment comprises multiple compartments arranged to enable removal of items from carry-on luggage for airport security checks without opening the main compartment, and at least one of the following:
at least one vacuum bag stored within the container body portion and available to reduce a volume of contents of the suitcase; or
at least one detachable sack or pocket to keep essential articles closer at hand when checking the suitcase or storing it in an overhead bin.

17. A wheeled container having multiple wheel sets, comprising:
a body portion, including at least one compartment for holding personal items and goods; and multiple selectively usable wheel sets, including:
- a first wheel set including a first type of wheels and positioned at a bottom of the body portion, said first wheel set being positioned in a plane that is horizontal when the container is in an upright position; and
- a second wheel set including a second type of wheels positioned at an edge on at least one side of the bottom of the container,
- wherein one of the first or second wheel sets includes at least four multidirectional spinner wheels or at least four swivel caster wheels,
- wherein another of the first and second wheel sets includes at least one powered non-swiveling wheel adapted to be driven by a motor to propel the container while the container is supported by the at least four multidirectional spinner wheels or at least four swivel caster wheels,
- wherein a user is able to select alternative transport modes, including (a) a manual transport mode in which the container is manually propelled by the user while the container is supported by four of the multidirectional spinner or swivel caster wheels in an upright position, or supported by two of the multidirectional spinner or swivel caster wheel when the container is pulled by an extendable handle, and (b) a driven transport mode in which the container is propelled by movement of the at least one non-swiveling wheel driven by the motor, and
- wherein the extendable handle includes a handle grip and at least one electronic component for controlling the motor; and
- a third set of wheels including wheels of a third type positioned at a back side or corner of the container to support a weight of the container when the container is being transported in the tilted position or vertically on an inclined surface or over steps and arranged to be moved to a position that is within or flush with a casing of the container,
- wherein the third set of wheels is released by a releasing mechanism from the position that is within or flush with a casing of the container so as to pivot to a position in which the third set of wheels rests on the inclined surface or steps to contribute to support of the weight of the container; and
- at least one power source including at least one rechargeable portable battery, the power source supplying power to at least the motor.

18. A wheeled container as claimed in claim 17, wherein the container is a suitcase.

* * * * *